United States Patent
Morishima

(10) Patent No.: US 6,920,095 B2
(45) Date of Patent: Jul. 19, 2005

(54) OPTICAL DISK RECORDING METHOD AND APPARATUS

(75) Inventor: Morito Morishima, Fukuroi (JP)

(73) Assignee: Yamaha Corporation, Hamamatsu (JP)

( * ) Notice: Subject to any disclaimer, the term of this patent is extended or adjusted under 35 U.S.C. 154(b) by 348 days.

(21) Appl. No.: 10/179,139

(22) Filed: Jun. 25, 2002

(65) Prior Publication Data

US 2003/0002409 A1 Jan. 2, 2003

(30) Foreign Application Priority Data

Jul. 2, 2001 (JP) .................................... 2001-201217

(51) Int. Cl.$^7$ ................................................ G11B 7/00
(52) U.S. Cl. .................. 369/47.38; 369/47.44
(58) Field of Search .................... 369/47.32, 47.33, 369/47.36, 47.38, 47.39, 47.4, 47.44

(56) References Cited

U.S. PATENT DOCUMENTS 4,750,059 A * 6/1988 Syracuse ..................... 360/48

FOREIGN PATENT DOCUMENTS

| JP | 07-073571 | 3/1995 |
|---|---|---|
| JP | 08-007498 | 1/1996 |
| JP | 09-288860 | 11/1997 |
| JP | 10-049990 | 2/1998 |
| JP | 10-105972 | 4/1998 |
| JP | 10-188464 | 7/1998 |
| JP | 10-293961 | 11/1998 |
| JP | 11-273073 | 10/1999 |
| JP | 2001-067672 | 3/2001 |
| JP | 2001-176194 | 6/2001 |

* cited by examiner

Primary Examiner—Nabil Hindi
(74) Attorney, Agent, or Firm—Pillsbury Winthrop Shaw Pittman LLP

(57) ABSTRACT

OPC data record in an optical disk is performed at a plurality of record velocities to obtain a maximum record velocity Vlmax. A rotation number of the optical disk is calculated and set, the rotation number being determined in such a manner that the maximum record velocity Vlmax becomes equal to a linear velocity of the optical disk at a detected record position of the optical disk along the radial direction. The optical disk is rotated under a rotation control that a detected actual revolution number of the optical disk becomes equal to the calculated and set rotation number. It is monitored to check whether the record operation of the optical disk at the maximum record velocity Vlmax is normal. If it is detected that the record operation may become abnormal, the maximum record velocity is lowered by $\Delta v1$.

14 Claims, 5 Drawing Sheets

OPTICAL DISK RECORDING METHOD AND APPARATUS

CROSS REFERENCE TO RELATED APPLICATION

This application is based on Japanese Patent Application No. 2001-201217, filed on Jul. 2, 2001, the entire contents of which are incorporated herein by reference.

BACKGROUND OF THE INVENTION

A) Field of the Invention

The present invention relates to an optical disk recording method and apparatus for recording data in an optical disk such as CD-R, CD-RW, CD-WO, MD and DVD, and more particularly to an optical disk recording method and apparatus for properly recording data in an optical disk in a manner matching the environments and the like of an optical disk drive.

B) Description of the Related Art

An optical disk recording apparatus for recording data in an optical disk such as CD-R and CD-RW performs an optimum power control (OPC) to obtain beforehand an optimum optical power of the optical disk. OPC obtains an optimum optical power in accordance with the characteristics of a storage medium, the characteristics of a laser diode (LD), a variation of the optical power and the like in order to record data at the optimum optical power. OPC is a record power control method in which trial write of test data is performed in a power calibration area (PCA) of the innermost circumference of the optical disk by stepwise changing an LD record power at a predetermined recording velocity (linear velocity). β (asymmetry) of a signal reproduced from the test data is evaluated and the record power which realizes the best β is determined as the optimum record power at the record velocity used. Japanese Patent Application Laid-Open Nos. Hei10-105972 and Hei11-273073 disclose an optical disk recording method in which test data is recorded in a plurality of areas along a circumferential direction of an optical disk and the optical record powers obtained in respective areas are averaged in order to suppress the influence of sensitivity variations.

An optical disk recording apparatus for recording data in an optical disk at a constant linear velocity can shorten a record time by recording data at a high velocity such as 2×, 4× and 8× relative to a reproducing velocity (standard velocity). An optical disk proper record velocity judgement method is also proposed (Japanese Patent Application Laid-Open No. 2001-67672) in which OPC is performed by changing the record velocity and record power, recorded data is reproduced, the qualities of reproduced signals are measured, the highest velocity corresponding to the record power realizing the reproduced signal quality in a predetermined allowance range is displayed as a recommended velocity, and a user sets this record velocity for the actual record of data.

With the above-described conventional optical disk recording methods, the optimum (highest) record velocity is determined by OPC prior to the actual data record. During the actual data record, data may become missing if the load of a host computer becomes heavy and the data transfer rate lowers, if the record laser power increases near to the maximum value because of a change in ambient environments.

SUMMARY OF THE INVENTION

An object of this invention is to provide an optical disk recording method and apparatus capable of recording data always at an optimum record velocity without any missed data by adaptively changing the record velocity even if the optimum record velocity of an optical disk changes with environments or the like.

According to one aspect of the present invention, there is provided an optical disk recording method comprising the steps of: (a) obtaining a maximum record velocity capable of a normal record operation by performing a test record at a plurality of record velocities for an optical disk to be recorded with data; (b) calculating and setting a revolution number of the optical disk, the revolution number being determined in such a manner that the maximum record velocity of the optical disk becomes equal to a linear velocity of the optical disk at a detected record position of the optical disk along a radial direction; (c) recording data in the optical disk under a revolution control of the optical disk that an actual revolution number detected from the optical disc becomes equal to the calculated and set rotation number; (d) monitoring whether a record operation of the optical disk at the maximum record velocity is normal or not; and (e) lowering the maximum record velocity by a predetermined amount when said monitoring step (d) detects that the record operation may become abnormal.

Prior to an actual data record of an optical disk, test data record is performed for the optical disk at a plurality of record velocities to obtain a maximum record velocity. During the actual data record, it is monitored to check whether the record operation of the optical disk at the maximum record velocity is normal. If it is checked that the record operation may become abnormal, the maximum record velocity is lowered by a predetermined value. It is therefore possible to record data always at an optimum record velocity without any missed data by adaptively changing the record velocity even if the optimum record velocity of an optical disk changes with environments or the like.

The subjects to be monitored during the data record includes either a remaining data capacity of a buffer for storing data to be transferred from a host and recorded in an optical disk, whether a record laser power reaches near a maximum value, or whether an intensity of light of a record laser reflected from an optical disk reaches a predetermined value. A width (predetermined width) of the maximum record velocity to be lowered when it is detected that the record operation may become abnormal is preferably set to a width not influencing the record quality.

DESCRIPTION OF THE PREFERRED EMBODIMENTS

Figure 1:
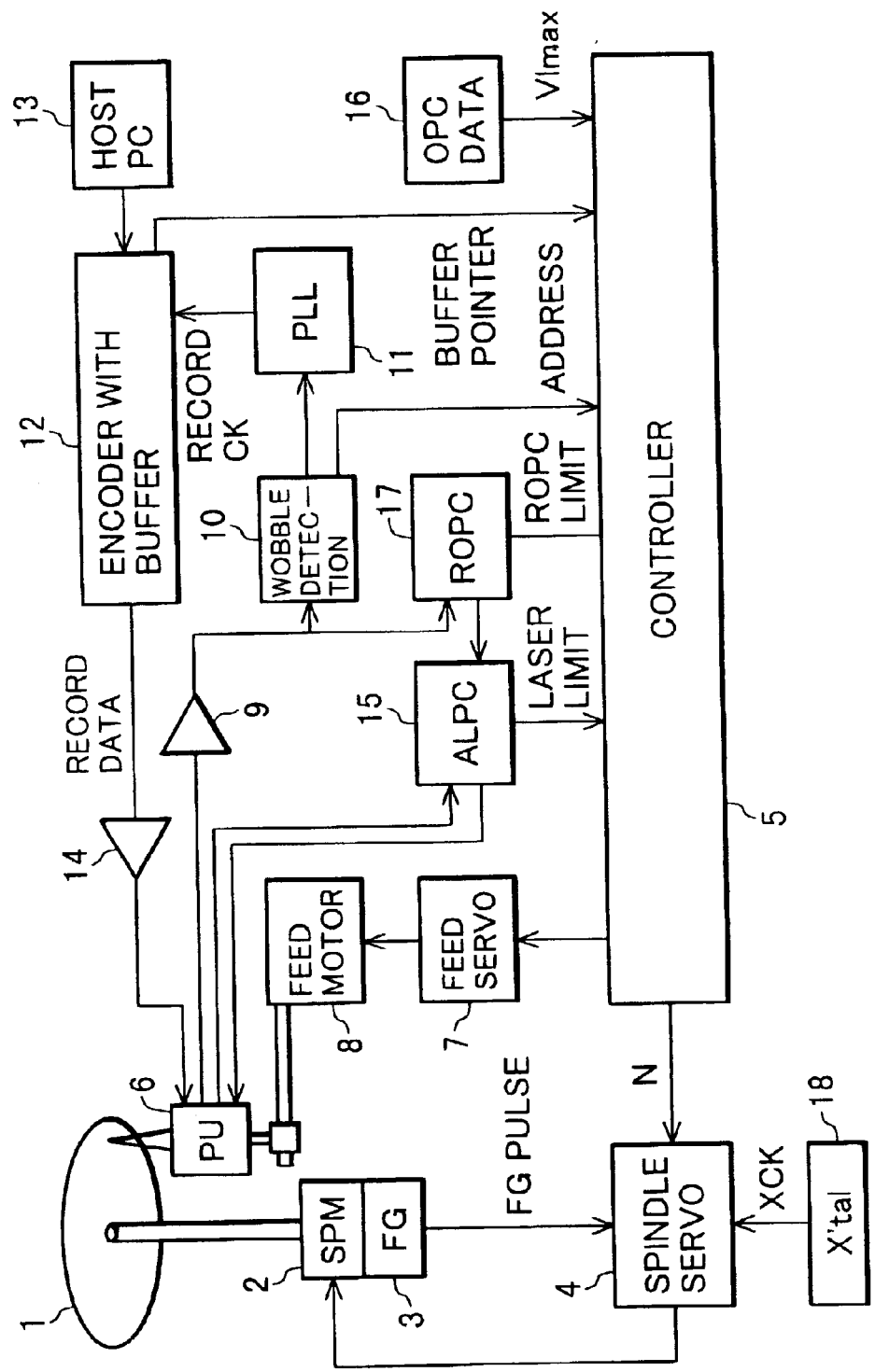
FIG. 1 is a block diagram showing the structure of an optical disk recording apparatus according to an embodiment of the invention.

FIG. 1 is a block diagram showing the structure of the main part of an optical disk recording apparatus according to an embodiment of the invention.

An optical disk 1 is a storage medium such as CD-R and CD-RW capable of recording and reproducing data. The optical disk 1 has a unicursal spiral track extending from the innermost to outermost circumferences of a record area. A linear velocity control signal is formed along the track in order to record data at a constant linear velocity (CLV). In this example, this linear velocity control signal corresponds to a wobble including codes of absolute time in pregroove (ATIP) which are absolute time information. The optical disk 1 is rotated by a spindle motor (SPM) 2. The rotary shaft of the optical disk 1 is coupled to a frequency generator (FG) 3 made of a Hall-effect element or the like. FG pulses output from the frequency generator 3 are input to a spindle servo circuit 4.

The spindle servo circuit 4 is input from a controller 5 with a frequency division ratio N to be used for determining the revolution number. The spindle servo circuit 4 compares a signal obtained through N frequency division of crystal oscillator clocks XCK from a crystal oscillator 18 with the FG pulses, and controls the rotation of the spindle motor 2 in such a manner that the frequencies of both the N-divided signal and FG pulses become equal. In this manner, the optical disk 1 is rotated at the constant angular velocity (CAV).

An optical pickup (PU) 6 is disposed facing the optical disk 1 in order to record and reproduce data. The controller 5 controls a feed motor 8 via a feed servo circuit 7 to determine the position of the optical pickup 6 along the optical disk radial direction. A wobble signal read with the optical pickup 6 is supplied via an RF amplifier 9 to a wobble detector circuit 10 which extracts an ATIP time code and an ATIP clock to detect an address of the optical disk 1. The detected address shows the position of the optical disk 1 along the radial direction and is supplied to the controller 5. The controller 5 determines the frequency division ratio N from the address. The ATIP clock extracted by the wobble detector circuit 10 is input to a PLL circuit 11 which generates a record clock synchronous with the ATIP clock. The generated record clock is supplied to an encoder 12 with a buffer.

Data to be recorded and supplied from a host personal computer (host computer) 13 is subjected to cross interleaved Reed-Solomon code (CIRC) processing, sub-code data addition, eight to fourteen modulation (EFM) and the like at the encoder 12 to thereby form record data. A buffer pointer indicating the storage amount in the buffer of the encoder 12 is monitored by the controller 5. The record data is supplied via a record driver 14 to the optical pickup 6. The optical pickup 6 forms a record pit in the optical disk 1 at a laser write power. During data recording, an automatic laser power control (ALPC) circuit 15 monitors light reflected from the optical disk 1 to control the laser power. When the laser power reaches near the maximum value or limit power, the ALPC circuit 15 outputs a laser limit signal to the controller 5. An OPC data memory 16 stores the maximum record velocity Vlmax obtained during test data record prior to actual data record. Vlmax is being supplied to the controller 5. A running OPC (ROPC) circuit 17 monitors the level of return light during actual data record and controls the record power in accordance with a change in the return light level. An ROPC limit signal output from the ROPC circuit 17 is being supplied to the controller 5.

Next, the record operation of the optical disk recording apparatus constructed as above will be described.

Figure 2:
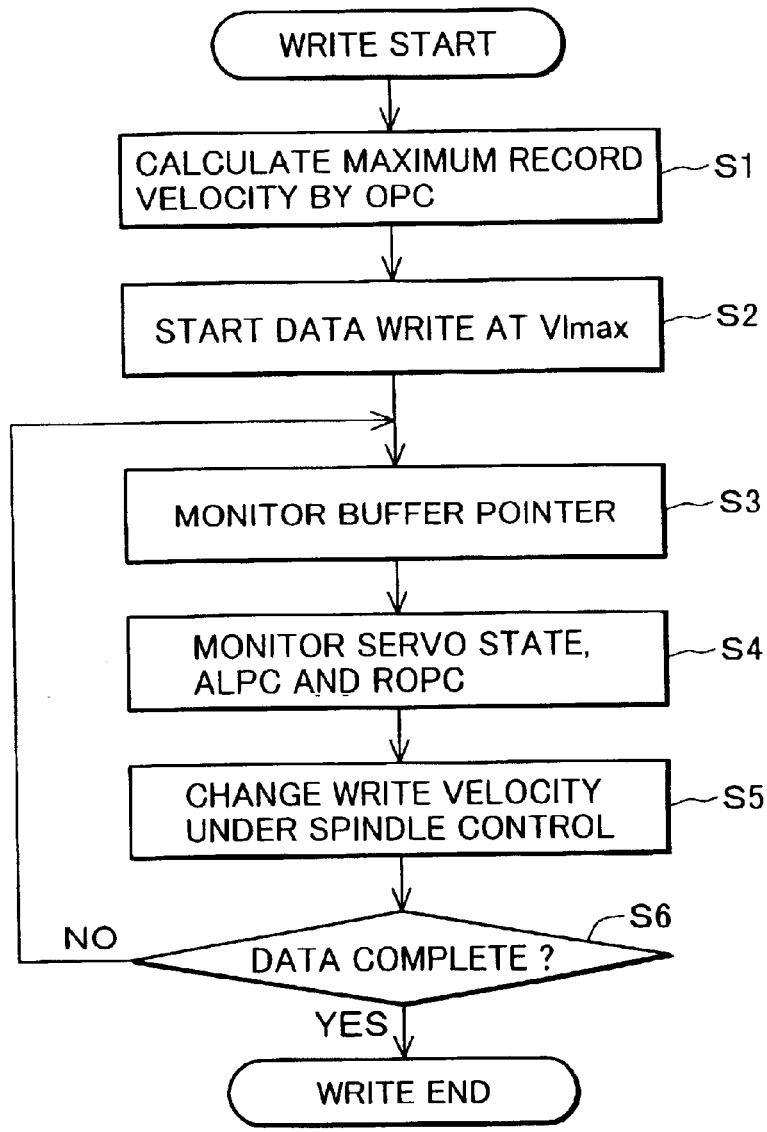
FIG. 2 is a flow chart illustrating an optical disk recording method to be used with the optical disk recording apparatus.

FIG. 2 is a flow chart illustrating the record operation to be controlled by the controller 5.

Figure 3:
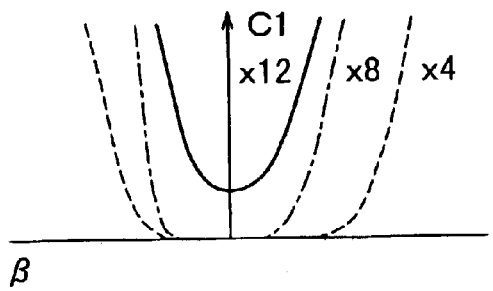
FIG. 3 is a graph showing the relation between β and an C1 error at each record linear velocity during execution of OPC.
Figure 4A:
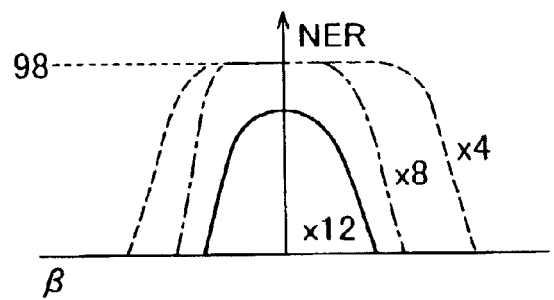
FIGS. 4A and 4B are graphs showing the relation between β and a C1 error at each record linear velocity during execution of OPC.
Figure 4B:
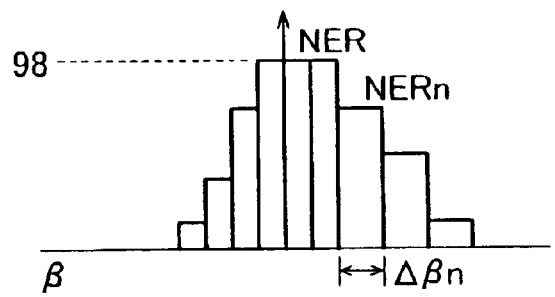

First, a target laser power is measured by performing OPC test data record. In this case, the OPC test data record is performed at different velocities and the maximum record velocity Vlmax is obtained (S1). Generally, an C1 error, a CU error, a PLL synchronization state, an EFM jitter, a write β (asymmetry) and the like are measured during OPC test data record by stepwise changing a laser power, and evaluated to obtain an optimum power. These operations are performed at different record velocities. For example, the graph shown in FIG. 3 is obtained where β is the abscissa and the C1 error is the ordinate. Generally, measurements are performed often in the unit of sub-code in the case of CD-R. Therefore, the maximum value per one measurement unit is 98 frames. In order to evaluate the write quality, the graph shown in FIG. 4A with upward convex curves is obtained in which the ordinate represents NER which is the number of frames without error obtained by subtracting 98 from C1 limited at the maximum 98, and the abscissa represents β. The write quality is evaluated from the area surrounded by each curve. Since the laser power is actually changed stepwise, the measured values of β are discontinuous so that the bar graph shown in FIG. 4B is obtained. An area of a sum of $\Delta\beta n$ multiplied by NERn at each laser power #n is used as a write quality SQ which can be used for write quality evaluation:

$$SQ=\Sigma\Delta\beta n * NERn$$

Figure 5:
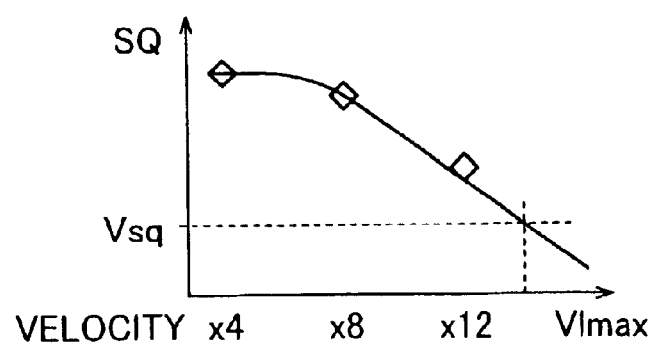
FIG. 5 is a graph showing the relation between a record linear velocity and a record quality.

As shown in the graph of FIG. 5, an approximate equation representative of the relation between SQ and record velocity is obtained by the least square method. The maximum record velocity Vlmax is calculated from the allowable write quality Vsq. In the above description, although the maximum record velocity Vlmax is calculated by using C1 errors, other reproduction quality parameters may also be used such as jitter and CU errors. A proper parameter can be selected in accordance with the tradeoffs between a desired precision and necessary signal processing. If the precision is insufficient, a plurality of OPC read operations may be performed or the number of write frames is increased by reducing the number of steps of OPC write operations, to thereby improve the precision. The maximum record velocity may be calculated from the laser power maximum value, a minimum value of β relative to the laser power or the like. By using the minimum value among calculated maximum record velocities, a more reliable maximum record velocity can be calculated. The calculated maximum record velocity Vlmax is stored in the OPC data memory 16.

Figure 6A:
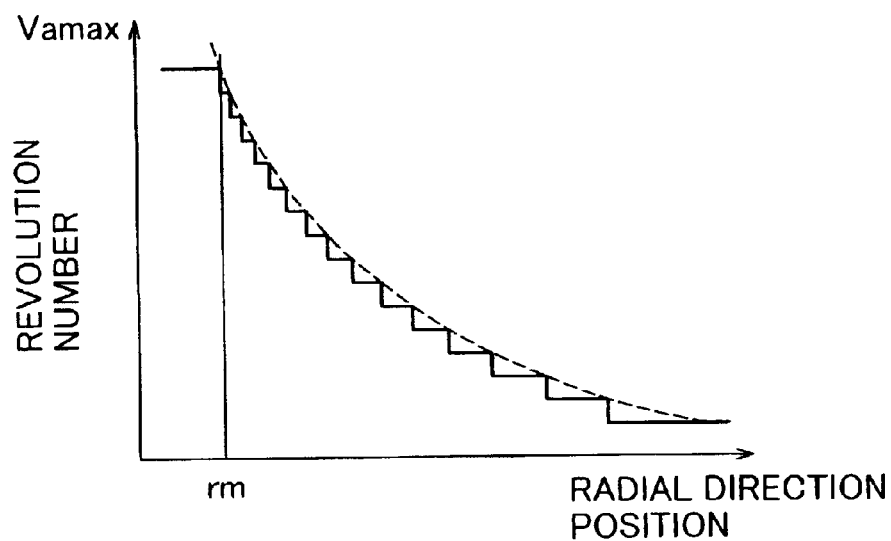
FIGS. 6A and 6B are graphs showing the relation among a radial position of an optical disk, a spindle revolution number and a record linear velocity.
Figure 6B:
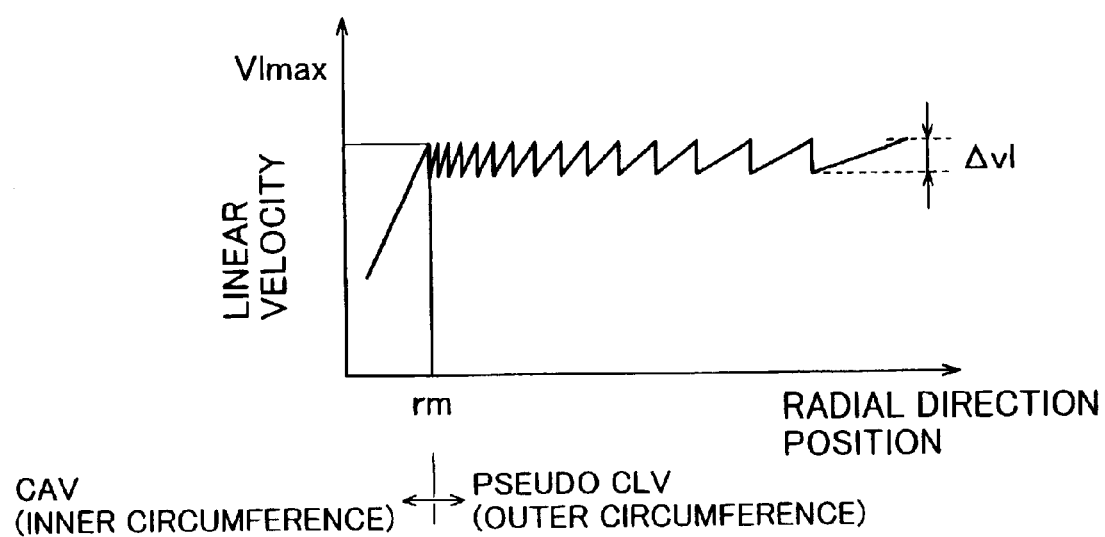

After the maximum record velocity Vlmax is determined, the controller 5 starts the record operation by setting the revolution number of the spindle motor 2 satisfying the maximum record velocity Vlmax at each record position of the optical disk 1 along the radial direction (S2). FIGS. 6A and 6B are graphs showing the relation among the access (record) position of the optical disk 1 along the radial direction, the number of revolutions and the linear velocity according to the embodiment. In this embodiment, the revolution of the optical disk is under a Partial CAV control. A CAV control is performed for the optical disk 1 on the inner circumferential side during the record start period where the revolution number of the spindle motor 2 is set to a maximum controllable revolution number Vamax, whereas a pseudo CLV control is performed on the outer circumferential side than the access position rm where the linear velocity reaches the maximum record velocity Vlmax.

First, the controller 5 sets a frequency division ratio N to the spindle servo circuit 4, the frequency division ratio N satisfying the revolution number Vamax of the spindle motor 2 during the record start period. The Hall-effect element as the detector of the frequency generator 3 coupled to the spindle motor 2 generates an FG pulse signal having a width corresponding to the revolution number of the spindle motor 2. The spindle servo circuit 4 controls the revolution number of the spindle motor 2 in such a manner that the FG pulse signal becomes synchronous with the crystal oscillator clocks XCK from the crystal oscillator 18 after they are frequency divided by the frequency division ratio N. When the spindle motor 2 reaches the revolution number Vamax, the CAV control loop of the spindle servo circuit 4 is closed.

As shown in FIG. 6B, as an optical disc of CLV is controlled by CAV, the linear speed increases from the inner to outer circumferences. An increase in the linear velocity means high speed recording. The higher the record speed, the more the laser power is required. However, there is a limit of an output of a laser diode (LD). If the laser power exceeds this limit, LD may be broken. It is therefore required to suppress the laser power lower than the limit. The maximum record velocity is also limited by system environments such as disk quality and data transfer speed. The maximum record velocity initially set is the maximum record velocity Vlmax stored in the OPC data memory 16.

While data is recorded, the optical pickup 3 reads the ATIP time codes of the optical disk 1. The time codes are decoded by the wobble detector circuit 10. As the time codes, Land Pre-Pits, fine clock marks or the like may be used in addition to the wobble signal. The time code is defined in the unit of frame. When the frame is read, the PLL or time code decoder 11 decodes the ATIP time code. The ATIP time code corresponds to the radial position of the optical disk 1. The revolution number of the optical disc corresponding to the time code position can be calculated from the time code. The controller 5 monitors the ATIP time code and when it detects that the optical pickup reaches the limit position, the number of pulses set for the CAV control is changed to enter the pseudo CLV control using the maximum record velocity Vlmax as the limit value.

During this pseudo CLV control, the controller 5 calculates from the read ATIP time code the revolution number for the limit velocity CLV control at the radial position corresponding to the ATIP time code, and sets the frequency division ratio N corresponding to the revolution number to the spindle servo circuit 4. After one frame, the next ATIP time code is read. Similarly, the controller 5 calculates from the read ATIP time code the revolution number for the limit velocity CLV control at the radial position corresponding to the ATIP time code, and sets the frequency division ratio N corresponding to the revolution number to the spindle servo circuit 4. In the operation to follow, each time the ATIP time code advances by one frame, the controller 5 sets the frequency division rate N corresponding to the revolution number to the spindle servo circuit 4 to control the spindle motor 2 to have the calculated revolution number. In this manner, data record under the pseudo CLV control can be performed by continuously coupling very minute CAV record operations.

The maximum record speed Vlmax during the record start period is determined by OPC. This data record linear velocity is lowered by $\Delta v1$ in order not to degrade the record quality (S5), if the data transfer speed at the host PC 13 becomes insufficient, if the record-laser power reaches near the maximum value, or if an abnormal state of ALPC, ROPC, or the servo state is detected, while monitoring the buffer pointer of the buffer of the encoder 12 (S3) and monitoring ALPC, ROPC and the servo state (S4). This control operation is continuously executed until data record is completed (S6). This control operation will be described more in detail.

Figure 7:
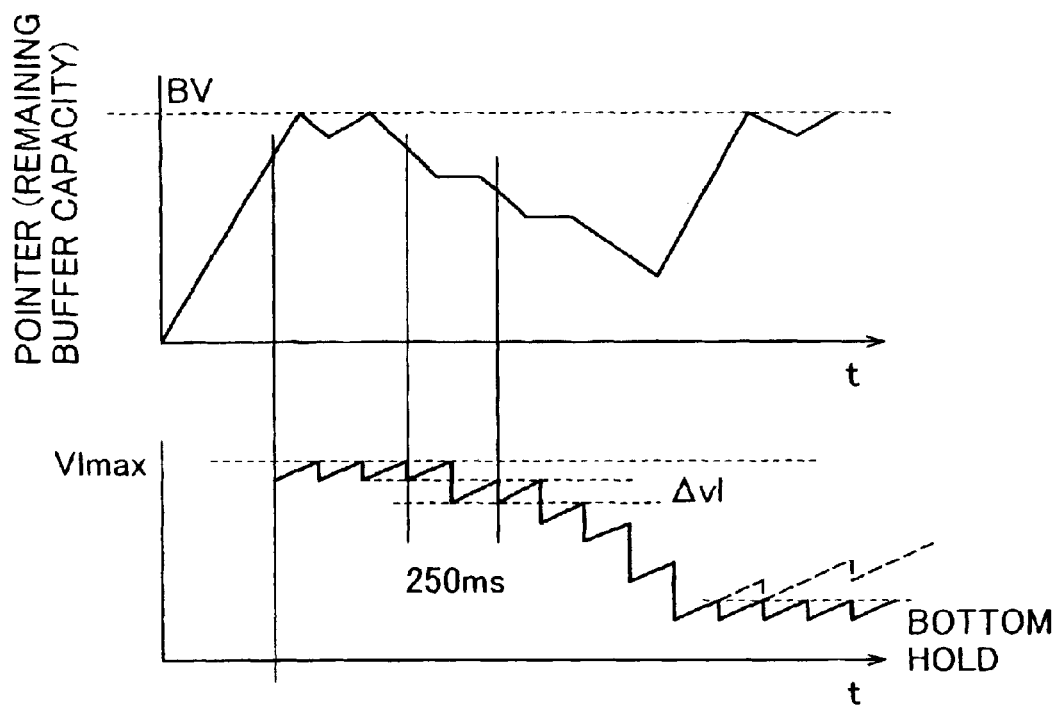
FIG. 7 is a graph showing the relation among a record time, a remaining buffer capacity and a record linear velocity.

FIG. 7 is a graph showing the relation among a record time, a buffer pointer (remaining buffer capacity) and a record linear velocity. The record operation starts after data is loaded in the buffer of the encoder 12 to some degree (to BV). The data record starts initially at the frequency division ratio Nmin of the crystal oscillator clocks XCK corresponding to the maximum record linear velocity Vlmax determined by OPC. As the linear velocity reaches Vlmax, the frequency division ratio N is increased by $\Delta N$. Such an operation is repeated so that the record linear velocity has a sawtooth shape having a change width of $\Delta v1$. For example, as the load of the host PC 13 increases because of other application processes so that the data transfer speed lowers and the remaining buffer capacity reduces, the controller 5 detects this from the buffer pointer and increases the frequency division ratio N in order to unconditionally lower the record linear velocity by $\Delta v1$. In this case, the record velocity may be changed to the original record velocity after the remaining buffer capacity reaches again the predetermined value BV. However, since there is a possibility that the remaining buffer capacity reduces again, a hold mode for holding a proper record linear velocity may be provided.

As the record linear velocity is increased, a response of the optical disk 1 becomes weak or record errors are likely to occur because of dusts, surface vibration, eccentricity or the like. For example, although ROPC changes the target laser power of ALPC in accordance with the level of light reflected during recording, as the record linear velocity increases, the response of the optical disk 1 becomes weak and a change in the reflected light becomes small. If ALPC is performed in accordance with the reduced change, an excessive laser power is supplied. In order to avoid this, the record velocity is lowered when the reflection light amount takes a preset value or larger or before ALPC reaches the maximum laser power. Similarly, if tracking servo and focus servo fluctuate abnormally because of surface vibration, eccentricity or the like, the lower frequency components of the servo signals fluctuate. This fluctuation detection signal is used to lower the record velocity so that stable data write is possible even for an optical disk which is otherwise considered a defective disc.

A series of record velocity variable sequences are cyclically executed in a time not influencing the record quality, i.e., in a predetermined time not disturbing various servo systems.

The present invention has been described in connection with the preferred embodiments. The invention is not limited only to the above embodiments. It is apparent that various modifications, improvements, combinations, and the like can be made by those skilled in the art.

I claim:

1. An optical disk recording method comprising the steps of:
    (a) obtaining a maximum record velocity capable of a normal record operation by performing a test record at a plurality of record velocities for an optical disk to be recorded with data;
    (b) calculating and setting a revolution number of the optical disk, the revolution number being determined in such a manner that the maximum record velocity of the optical disk becomes equal to a linear velocity of the optical disk at a detected record position of the optical disk along a radial direction;

(c) recording data in the optical disk under a revolution control of the optical disk such that an actual revolution number detected from the optical disc becomes equal to the calculated and set revolution number;

(d) monitoring whether a record operation of the optical disk at the maximum record velocity is normal or not; and (e) lowering the maximum record velocity by a predetermined amount when said monitoring step (d) detects that the record operation may become abnormal.

2. An optical disk recording method according to claim 1, wherein said monitoring step (d) monitors the normal record operation by monitoring a remaining data capacity of a buffer for storing data to be transferred from a host and recorded in the optical disk.

3. An optical disk recording method according to claim 1, wherein said monitoring step (d) monitors the normal record operation by monitoring whether a record laser power reaches near a maximum value.

4. An optical disk recording method according to claim 1, wherein said monitoring step (d) monitors the normal record operation by monitoring whether an intensity of light of a record laser reflected from the optical disk reaches a predetermined value.

5. An optical disk recording method according to claim 1, wherein said monitoring step (d) monitors the normal record operation by monitoring an abnormal fluctuation of tracking and/or focus servo.

6. An optical disk recording apparatus comprising:

a driver that rotates an optical disk in which data is to be recorded;

a calculator that sets a target linear velocity to be used for recording data in the optical disk and calculating and setting a revolution number of the optical disk, the revolution number being determined in such a manner that the set target linear velocity becomes equal to a linear velocity of the optical disk at a detected access position of the optical disk along a radial direction;

a detector that detects an actual revolution number of the optical disk; and a servo controller that controls said driver so as to make the actual revolution number detected by said detector equal to the revolution number calculated by said calculator, wherein, prior to actual data record, said calculator obtains a maximum record velocity capable of a normal record operation by performing a test record at a plurality of record velocities for the optical disk to be recorded with data, monitors whether a record operation of the optical disk at the maximum record velocity is normal or not, and lowers the maximum record velocity by a predetermined amount when it is detected that the record operation may become abnormal.

7. An optical disc recording apparatus according to claim 6, wherein said calculator determines the maximum record velocity by monitoring one of a remaining data capacity of a buffer for storing data to be transferred from a host and recorded in the optical disk, whether a record laser power reaches near a maximum value, and whether an intensity of light of a record laser reflected from the optical disk reaches a predetermined value.

8. An optical disk recording method comprising the steps of:

(a) obtaining a maximum record velocity capable of a normal recording quality by performing a test record at a plurality of record velocities for an optical disk to be recorded with data;

(b) recording data in accordance with a linear velocity control signal under a revolution control of the optical disk at a fixed number of revolutions;

(c) calculating a record velocity from the linear velocity control signal;

(d) detecting that the record velocity calculated from the linear velocity control signal reaches the maximum record velocity;

(e) lowering the fixed number of revolutions at said recording step (b) by a predetermined number when said detecting step (d) detects that the record velocity reaches the maximum record velocity;

(f) monitoring whether a record operation of the optical disk at the maximum record velocity is normal or not; and (g) lowering the maximum record velocity of the recording step (b) by a predetermined amount when said monitoring step (f) detects that the record operation may become abnormal.

9. An optical disk recording method to claim 8, wherein said monitoring step (f) monitors the normal record operation by monitoring a remaining data capacity of a buffer for storing data to be transferred from a host and recorded in the optical disk.

10. An optical disk recording method according to claim 8, wherein said monitoring step (f) monitors the normal record operation by monitoring whether a record laser power reaches near a maximum value.

11. An optical disk recording method according to claim 8, wherein said monitoring step (f) monitors the normal record operation by monitoring whether an intensity of light of a record laser reflected from the optical disk reaches a predetermined value.

12. An optical disk recording method according to claim 8, wherein said monitoring step (f) monitors the normal record operation by monitoring an abnormal fluctuation of tracking and/or focus servo.

13. An optical disk recording apparatus comprising:

a revolution driver that revolves an optical disk in which data is to be recorded at a fixed number of revolutions;

a linear velocity control signal detector that detects a linear velocity control signal from the optical disk revolved at the fixed number of revolutions by said revolution driver;

a recorder that records data in accordance with the linear velocity control signal;

a record velocity calculator that calculates a record velocity from the linear velocity control signal;

a maximum record velocity detector that detects whether or not the linear velocity of the optical disk reaches a maximum record velocity while the recorder is recording data;

a servo controller that lowers a number of revolutions for the fixed number of revolutions driven by said revolution driver by a predetermined number while said recorder is recording data when said maximum record velocity detector detects that the linear velocity of the optical disk reaches the maximum record velocity; and a monitoring device that monitors whether the record operation of the optical disk at the maximum record velocity is normal or not, wherein prior to acutal data record, the maximum record velocity is obtained as a maximum velocity capable of a normal recording quality by performing a test record at a plurality of record velocities for an optical disk to be recorded with data, and said servo controller lowers the maximum record velocity by a predetermined amount when the monitoring device detects that the record operation may become abnormal while the recorder is recording data.

14. An optical disc recording apparatus according to claim 13, wherein said monitoring device detects that the record operation is normally executed or not by monitoring at least one of a remaining data capacity of a buffer for storing data to be transferred from a host and recored in the optical disk, whether a record laser power reaches near a maximum value, and whether an intensity of light of a record laser reflected from the optical disk reaches a predetermined value.

* * * * *